United States Patent
Nguyen

Patent Number: 5,809,494
Date of Patent: Sep. 15, 1998

[54] METHOD FOR RAPIDLY AND EFFICIENTLY HASHING RECORDS OF LARGE DATABASES

[75] Inventor: John N. Nguyen, Belmont, Mass.

[73] Assignee: Applied Language Technologies, Inc., Boston, Mass.

[21] Appl. No.: 559,532

[22] Filed: Nov. 16, 1995

[51] Int. Cl.⁶ .................................................. G06F 17/30
[52] U.S. Cl. .................. 707/1; 364/419.19; 364/421.06; 364/410; 364/427
[58] Field of Search ..................................... 395/600, 601

[56] References Cited

U.S. PATENT DOCUMENTS

| | | | |
|---|---|---|---|
| 4,215,402 | 7/1980 | Mitchell et al. | 364/200 |
| 4,464,713 | 8/1984 | Benhase et al. | 364/200 |
| 4,959,785 | 9/1990 | Yamamoto et al. | 364/419 |
| 4,961,139 | 10/1990 | Hong et al. | 364/200 |
| 4,996,663 | 2/1991 | Nemes | 364/900 |
| 5,121,495 | 6/1992 | Nemes | 395/600 |
| 5,197,002 | 3/1993 | Spencer | 364/406 |
| 5,199,073 | 3/1993 | Scott | 380/49 |
| 5,204,958 | 4/1993 | Cheng et al. | 395/600 |
| 5,333,313 | 7/1994 | Heising | 395/600 |
| 5,359,720 | 10/1994 | Tamura et al. | 395/400 |
| 5,511,190 | 4/1996 | Sharma et al. | 395/600 |
| 5,542,087 | 7/1996 | Neimat et al. | 396/600 |

OTHER PUBLICATIONS

Glenn Fowler, "A Flat file database query language", Usenix, pp. 1–12, Jan. 1994.

C.J.Date "Introduction to Database Systems" Addison–Wesley Publishing Company, 6th ed. pp. 733–738, Aug. 1995.

*Primary Examiner*—Thomas G. Black
*Assistant Examiner*—Jean M. Corrielus
*Attorney, Agent, or Firm*—Cesari & McKenna, LLP

[57] ABSTRACT

A method for rapidly hashing records in a large database stored on a secondary storage device in which a set of memory-blocks are preferably established in main memory for receiving information. Each memory block is associated with a sub-range of hash values that collectively span a range of hash values derived from one or more fields of the database records. The hash values together with other information are distributed among the memory-blocks in accordance with the range of hash values. As each memory block fills, its contents are written to an intermediate file associated with the memory-block in secondary storage. The intermediate files are subsequently retrieved and the hash values stored therein are ordered. The ordered intermediate files are then written to secondary storage as a single hash table spanning the entire database.

9 Claims, 3 Drawing Sheets

METHOD FOR RAPIDLY AND EFFICIENTLY HASHING RECORDS OF LARGE DATABASES

BACKGROUND OF THE INVENTION

A. Field of the Invention

The invention relates to interactive, large vocabulary, speech recognition systems, and comprises a method for efficiently indexing a large number of records in such a system for subsequent rapid retrieval.

B. Prior Art

Interactive speech recognition systems typically engage in a colloquy with a user to enable some action to be taken or some goal to be achieved. For example, a mail-order system employing speech recognition may guide a user through a discourse in which the system issues verbal prompts for selected information such as the user's name, address, telephone number, etc. preparatory to accepting an order from the user or providing desired information to the user.

Systems which are to deal with the public at large frequently include a large database (e.g., tens of millions of records or more) which is searched in response to selected user responses so as to validate the caller, retrieve information for the caller, etc. These searches must be performed rapidly and efficiently in "real time", that is, in a time that is not significantly greater than that expected for human-to-human interactions. Typically, this means response times on the order of seconds or less.

Because of their size, the requisite databases are maintained on secondary storage facilities such as magnetic disk drives. Thus, during interaction with a user, it is necessary to retrieve the particular record associated with a caller from the disk and bring it into primary storage (i.e., the computer's main memory in which programs are executed) for immediate access by the system. The most straightforward way to find the desired record is simply to proceed sequentially through the database, checking the identifying field (e.g., the caller's telephone number) of each record until the desired record is found. However, this procedure is prohibitively time-consuming, and thus unacceptable, if the database is large. For example, a sequential search of a database having eighty million records of forty characters per record would take on the order of an hour to retrieve the requisite record.

One data structure which is often employed to enable rapid retrieval of items is a "hash table". A hash table is typically an array of records that include at least a record identifier and a pointer to an address at which data corresponding to that record is stored. To generate the hash table, a mathematical transformation called a "hashing function," is applied to a particular field of a record (e.g., the identifying or "key" field) to generate a number, called the "hash value", which defines the address at which the particular hash record is to be stored. The hash record typically contains the key value which has been hashed to the hash value, and a pointer to the record identified by this key. To retrieve a given record, the hashing function is again applied to the identifying data element of the record to be retrieved to thereby create the desired address, or index to the address, for retrieval. Thus, direct retrieval of the desired record is enabled.

If the database to be searched is sufficiently small that its hash table can fit entirely into primary storage (such as RAM), the database can be rapidly hashed. However, if the database is so large that the resultant hash table does not fit into primary storage, one must build the hash table in secondary storage (such as a hard disk). However, each time an item is hashed, the location of that item must be sought and accessed in secondary storage. In most computer architectures, accessing a series of sequential locations in secondary storage is rapid, but accessing a series of non-contiguous locations, as required when hashing, is slow. Even with very fast disks, the time required to directly access a single record is in excess of 10 ms. In a database containing 80 million items, the otherwise routine task of hashing all the entries to prepare for use of the database would require in excess of 200 hours on a low end workstation of the type commonly used today.

SUMMARY OF THE INVENTION

A. Objects of The Invention

Accordingly, it is an object of the invention to provide a method of rapidly hashing records in an interactive speech recognition system.

Further, it is an object of the invention to provide a method of rapidly hashing records in the database of an interactive speech recognition system where the size of the database substantially exceeds the size of the main memory that is available for the hash table.

Another object of the invention is to provide a method of rapidly hashing records in the database of an interactive speech recognition system for efficient direct retrieval.

Yet a further object of the invention is to provide a method of rapidly hashing records of a large-scale database of a size substantially in excess of that of the active or main memory in which the hashing is to be performed.

B. Brief Description Of The Preferred Embodiment of The Invention

In accordance with the present invention, I establish a plurality of memory-blocks in main memory for receiving data associated with the records of the database to be hashed. Specifically, the data comprises hash values derived from one or more fields of the database, together with other information associated with the hash values, e.g., the addresses at which the associated records are stored. Each memory-block receives records having hash values within a defined sub-range of the entire range of values associated with the database. Collectively, the memory-blocks receive records which span the entire range of hash values.

Unlike temporary storage buffers which are commonly used in database storage and retrieval systems, the memory-blocks of the present invention are of substantial length and each comprises a single access unit for storage and retrieval during the hashing process, thus greatly increasing the efficiency of each disk access. The size of the memory-blocks, and the number of such blocks, will, of course, be dependent on the size of the active memory available to process the data. This memory is shared between the segment of the data that is being hashed at a given time and the memory-blocks that hold the intermediate results of that hashing. For example, to hash an 80 million record database in a computer system having a main memory (also known as primary memory, active memory, or RAM memory) of 64 megabytes, and a user work area on the order of 32 megabytes, I have found that 50 memory-blocks, each of size 500 kilobytes (500 KB, i.e., 512,000 bytes), can reduce the hashing time by one or more orders of magnitude. Each memory-block thus occupies only a fraction of the available user memory space and collectively fit comfortably within this space. For a large database containing tens of millions of records, each data block may occupy only a few percent of the available memory space.

The records of the original database are brought into main memory sequentially in successive chunks which are substantially less than the size of the database itself but of a size commensurate with the amount of main memory available for their processing. For example, a database of 80 million records, with 40 characters (bytes)/record, is advantageously brought into memory in 6250 successive 500 Kbyte (512, 000 byte) chunks of 12,800 records/chunk.

The records in each chunk are sequentially processed by calculating the hash value of the identifying field of each record and assigning the record to one of the memory blocks in accordance with the range of values within which the hash value for the record falls. For efficiency of storage, a record is "assigned" to a memory-block by creating within the memory-block an index table or hash record comprising a hash value within the range of hash values of the corresponding memory-block and one or more indexes specifying the record or records associated with the respective hash values.

As each memory-block fills, the hash records it contains are written to secondary storage, i.e., disk. In particular. the contents of the memory-block is written to disk as part of a single storage and retrieval unit, i.e., a file, and thus requires but a single write access. Each memory block corresponds to a distinct file, which receives all the hash records assigned to that memory block during the hashing of the database. The emptied memory-block is then ready to receive further records. The assignment of records to memory-blocks continues until the entire database has been examined and categorized in this manner and all the records of the database have been partially hashed into distinct groups corresponding to ranges of hash values associated with the respective memory-blocks.

At this stage, the records of the database have all been assigned to the intermediate files in which their hash values fall, but are otherwise unordered within the intermediate files. Accordingly, the intermediate files are brought into main memory, one at a time. This transfer to main memory requires but a single read access for each file, and is thus rapid. The records in the successive files are then assigned to locations (i.e., addresses) within the files corresponding to their respective hash numbers, and are then written back to disk into a single, common file which thus forms a single, integrated hash table that contains the hash value and reference address of each record of the database.

The invention described herein considerably reduces the number of disk accesses required, and thus significantly accelerates the hashing process. Further, it accomplishes this in an environment in which the amount of main memory available for ordering of the records is substantially less than the size of the database to be ordered. For example, through use of the present invention, I have reduced the time required to order an 80 million record database of 40 bytes/record in a 64 megabyte RAM system from the 200 plus hours noted above to less than one hour!

SPECIFIC DESCRIPTION OF THE INVENTION
A. Drawings

The foregoing and other and further objects and features of the invention will be more fully understood from reference to the following detailed description of the invention, when taken in conjunction with the accompanying drawings, in which.

B. Preferred Embodiment

Figure 1:
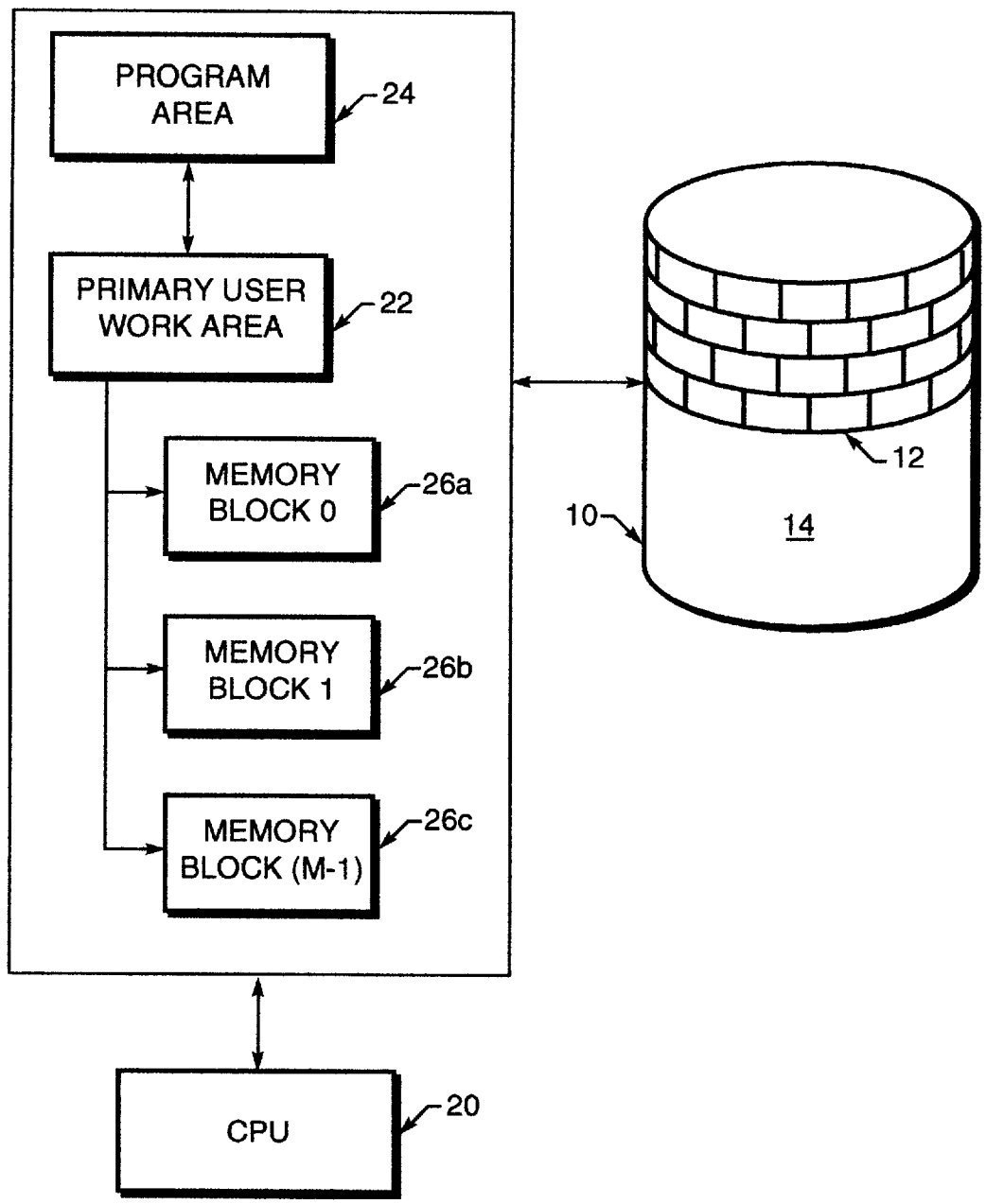
FIG. 1 is a block and line diagram of a computer system including primary and secondary storage and having a plurality of memory blocks for hashing a database in accordance with the present invention.
Figure 1A:
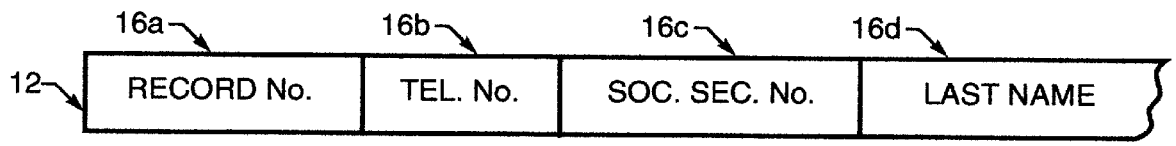
FIG. 1A is a schematic diagram of a typical record to be hashed.

In FIG. 1, a secondary storage device 10 such as a disk drive contains a number of records 12 comprising a database 14 and stored on the disk in locations that do not necessarily correspond (i.e., are not necessarily "mapped") to a selected identifying field such as telephone number, social security number, etc. Each record contains a number of fields 16a, 16b, 16c, etc. (see FIG. 1A) containing data items such as record number, telephone number, last name, first name, etc. One or more of the fields, e.g., field 16b, serves as a key or "identifying" field on which a hash value is to be calculated which will specify the location at which the associated record (or a pointer to the record) is to be stored. This will enable direct access to the record.

To this end, the database must be brought into a primary storage device such as the main memory 18 of a central processing unit 20 which will perform the hashing in memory 18 and store the hashed data back on the disk 10. The hashing is done in a primary user work area 22 under control of a program typically residing in a program area 24. Typically, the database is of a size substantially larger than that of the memory 18, and specifically larger than that of the user work area 22. For example, the database may be from tens to hundreds of times as large as the work area 22 or even more.

In accordance with the present invention, a plurality of memory-blocks 26a, 26b, 26c are established in main memory 18 separate from the work area 22. Each memory-block is of a size much smaller than that of the work area 22, but sufficiently large to accommodate retrieval information corresponding to a substantial number of records. For example, the user work area may be on the order of 32 megabytes in size, while each memory-block may advantageously be on the order of 500 kilobytes.

Each memory-block is adapted to receive retrieval information with respect to records having hash values falling within defined ranges. Thus, if H hash numbers are to be used to index the entire database, and the number of memory blocks is M, each block will accommodate information with respect to a range of R=H/M hash values (corresponding to approximately 1/Mth of the number of records). The first memory-block (memory-block 0) then receives retrieval information associated with hash values 0 through R−1; the next receives retrieval information associated with hash values R through 2*R−1; and the kth receives retrieval information associated with hash values k*R through (k+1) *R−1, where k ranges from 0 through M−1. Thus, as each record in the memory area is examined, the range in which its hash value falls is determined and it is then assigned to one of the M memory-blocks.

Figure 2:
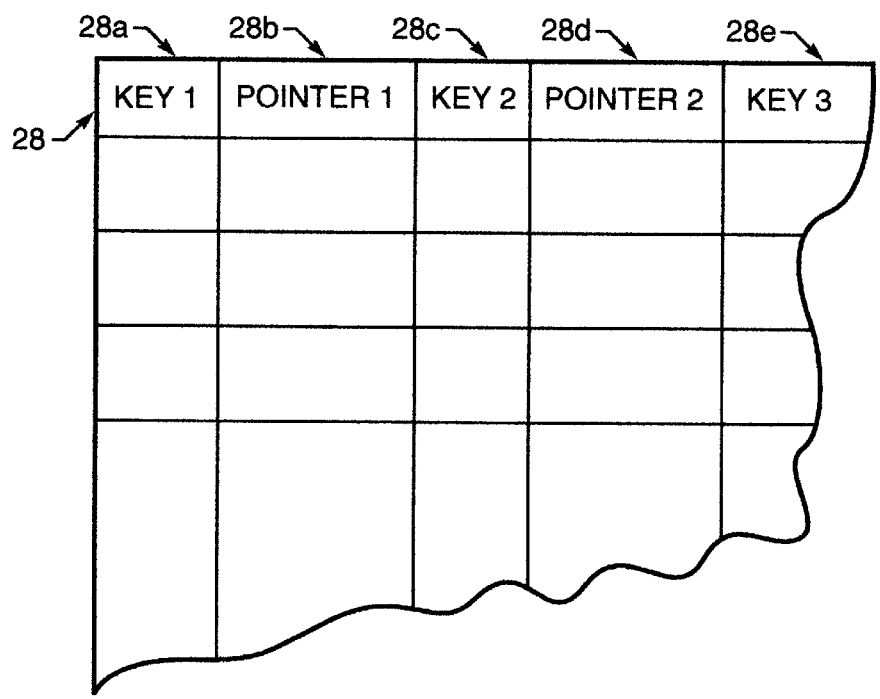
FIG. 2 is a schematic diagram of a memory block in accordance with the present invention.

FIG. 2 shows the form of a typical memory-block 26 which forms an intermediate file. In particular, each block is comprised of a number of records such as record 28 for storing information with respect to database records whose hash numbers fall within the block. The records typically include at least a first field 28a for storing the key value which has been hashed, and a second field that contains a pointer to that record. For example, the key field may comprise a telephone number associated with the record, and the pointer to the record may comprise the record number, from which the location of the record may readily be determined. Advantageously, the hash value is formed in a known manner on one of the data fields of the record whose value is unique to that record, e.g., the telephone number. For example, the hash number may be formed as the remainder modulo $10^8$ of the telephone number field of a record.

In order to handle the situation in which multiple records hash to the same address, additional fields 28c, 28d, 28e, 28f, etc. may be provided to store the keys and indices for the additional records. For purposes of illustration, the additional fields are shown as fixed fields of defined size within the record 28, but may advantageously be provided instead in the form of linked lists, so as to conserve storage space, as well as in other forms known to those skilled in the art.

The hashed data for successive records is accumulated in each memory-block until it fills, at which time the filled memory-block is written to disk as a single retrieval record or file, requiring only a single write. There are as many of these files as there are memory blocks, and the contents of the respective memory blocks are appended to corresponding files as the memory-blocks fill. The emptied memory-block is then available to receive further record information from database records being processed in the user work area. The process continues until all records in the database have been examined; the hash records relating to them have been formed and assigned to the appropriate memory block; and the contents of the respective memory blocks have been added to the corresponding intermediate files stored on the disk.

At this point the disk stores a number of intermediate files containing records corresponding to the various ranges into which the hash numbers have been divided, that is, the intermediate files corresponding to the respective memory blocks form indices which segment the original database into non-overlapping ranges according to the hash values that are within these ranges. The records in the intermediate files at this stage, however, are not located at addresses corresponding to their hash values. Accordingly, the intermediate files are brought into memory one at a time, and the records in each intermediate file are assigned to locations (addresses) within the file corresponding to their hash number. As each file is processed, it is appended to a single, final hash table on disk which accumulates the separately hashed files into a continuous composite final hash table which is then used to rapidly and directly access any record in the database.

It should be noted that the records of the final hash table are stored at addresses defined by the record hash numbers. Thus, the records themselves need not contain these hash numbers, and need contain only the pointers to the database records with which they are associated. Because of its size, the final hash table will typically be maintained on secondary storage.

Figure 3:
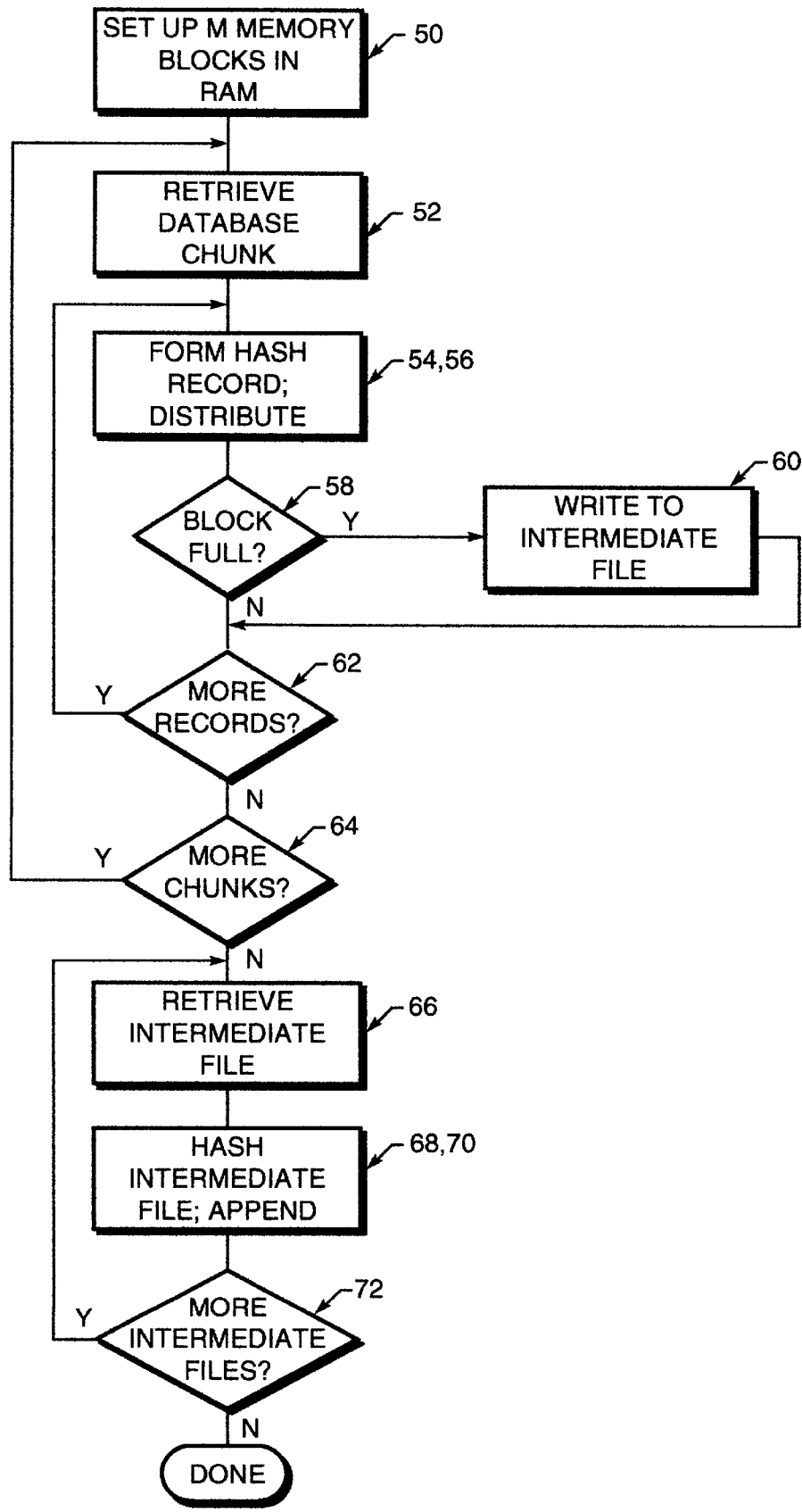
FIG. 3 is a flow diagram of the hashing process in accordance with the present invention.

The processing described above is illustrated in the flow chart of FIG. 3 to which reference should now be made. Processing begins at step 50 by establishing M memory blocks in main memory (RAM). A chunk of the database of substantial size but not larger than the primary work area 22 is then brought into the work area from disk storage (step 52). The chunk is processed record by record to form hash records corresponding to the respective database records (step 54). As noted above earlier, because more than one database record may hash to the same hash number, there generally will be fewer hash records than database records. As each database record is hashed, a hash record comprising at least the hash number and database record information (comprising either database record itself or the address of the database record, i.e., a pointer to the record, these being collectively referred to hereafter for ease of reference simply as "the address" of the record) is formed. This record is stored as a hash record (step 56) in the particular memory-block whose range of hash numbers encompasses the hash number for that record.

If an indication is received that a particular memory-block is full, that memory-block, which now contains intermediate hash records, is written to disk in a file corresponding to that specific memory-block (steps 58, 60, a "Y" indicating "yes" in response to the condition question, an "N" indicating "no"). As long as there are further records to be processed in the chunk, these records are processed in sequence (step 62) in the manner just described. On completion of a chunk of the database, the next chunk is brought into main memory and the process described above is repeated (step 64).

At this point, an intermediate file for each memory-block has been created and stored on disk. The respective intermediate files are then retrieved from disk (step 66), hashed (step 68), and appended one by one to a new, integrated hash file (step 70). When all the intermediate files have been hashed and appended to the final integrated hash file, the process terminates (step 72).

Although my invention has been illustrated by examples using a single hash value for a given record, it will be understood that multiple hash values may also be used. For example, the first six digits of a telephone number may be used as a first hash value, and the remaining four digits used as a second hash value. The first hash value determines the memory-block to which the record is assigned: the second determines position within the memory block and is stored as a field of the record itself. It will be understood by those skilled in the art that other changes may be made to the invention without departing from either the spirit or scope thereof, the foregoing description of a specific embodiment of the invention being intended to be illustrative only, the scope of the invention being defined in the claims.

CONCLUSION

From the foregoing it will be seen that I have provided a method for rapidly and efficiently hashing records stored in secondary storage such as a disk, even though the size of the database greatly exceeds the size of the available primary storage (main memory) available for hashing the records. The method minimizes the number of accesses required to hash the records, and efficiently makes use of the limited memory resources. The method is particularly useful in connection with interactive, large vocabulary speech recognition systems which are characterized by very large databases that must be accessed in real-time.

I claim:

1. A method for rapidly hashing records in a database stored on a secondary storage device, the size of said database exceeding that of a primary storage in which operations on said database are to be performed, comprising the steps of:

A. providing in primary storage a set of memory-blocks for receiving hash records therein, each said memory-block being associated with a sub-range of hash values that collectively span a range of hash values encompassing said database;

B. repeatedly retrieving from the secondary storage device groups of records and generating a hash value for each record;

C. associating each hash value with at least secondary storage address information for the respective record so as to form retrieval information comprising intermediate hash records that characterize the retrieved records;

D. distributing said retrieval information among said memory-blocks in accordance with the range of hash values associated with the respective records;

E. as each memory-block fills, writing the corresponding intermediate hash records to an intermediate file associated with the memory block in secondary storage to enable further intermediate hash records to be distributed to said memory-block;

F. retrieving said intermediate files from secondary storage and ordering the intermediate hash records therein so as to form hashed files; and G. writing the hashed files to secondary storage as a single composite file to form a hash table spanning the entire database.

2. The method of claim 1 in which each said memory-block is associated with a distinct sub-range of locations in which the records of said database are to be stored.

3. The method of claim 2 in which each said memory-block is associated with a subrange of less than 10% of the locations in which the records of said database are to be stored.

4. The method of claim 2 in which each said memory-block is associated with a subrange of less than 2% of the locations in which the records of said database are to be stored.

5. The method of claim 2 in which each memory block occupies less than 10% of the available primary memory user space.

6. The method of claim 2 in which each memory block occupies less than 2% of the available primary memory user space.

7. The method of claim 1 in which each said memory block, on filling, is appended to an intermediate file corresponding to said block to thereby form an extended file for amalgamating the successive contents of the corresponding memory-block.

8. The method of claim 7 in which said records are hashed by hash number.

9. The method of claim 8 which includes the step of generating at least a second hash value for each record, said second hash value being used to define the location of the hash record within the memory-block to thereby specify the location of said hash records within said block.

* * * * *